United States Patent
Craft et al.

(10) Patent No.: US 8,644,993 B1
(45) Date of Patent: Feb. 4, 2014

(54) METHOD OF CONTROLLING THE FLOW RATE OF THE LIQUID BY CONTROLLING OPERATION OF THE PUMP

(71) Applicant: USC, L.L.C., Sabetha, KS (US)

(72) Inventors: Timothy A. Craft, Holton, KS (US); Daniel M. Tramp, Sabetha, KS (US); Lynn E. Strahm, Sabetha, KS (US)

(73) Assignee: USC, L.L.C., Sabetha, KS (US)

( * ) Notice: Subject to any disclaimer, the term of this patent is extended or adjusted under 35 U.S.C. 154(b) by 0 days.

(21) Appl. No.: 13/870,139

(22) Filed: Apr. 25, 2013

Related U.S. Application Data

(63) Continuation of application No. 13/803,576, filed on Mar. 14, 2013.

(51) Int. Cl.
G05D 7/00 (2006.01)
G05D 11/00 (2006.01)
G05D 9/00 (2006.01)

(52) U.S. Cl.
USPC ........... 700/282; 700/281; 700/283; 700/284; 702/50; 702/55; 73/1.16; 73/1.34; 73/1.73; 137/8; 137/9; 137/286; 137/391

(58) Field of Classification Search
USPC ................ 700/281–284; 702/50, 55; 73/1.16, 73/1.34, 1.73; 137/8–10, 386, 391, 395
See application file for complete search history.

(56) References Cited

U.S. PATENT DOCUMENTS

| | | | | |
|---|---|---|---|---|
| 4,465,017 A | * | 8/1984 | Simmons | 118/418 |
| 5,010,838 A | * | 4/1991 | Simelunas et al. | 118/19 |
| 5,582,644 A | * | 12/1996 | Gaddis et al. | 118/303 |
| 5,884,570 A | * | 3/1999 | Lincoln | 111/130 |
| 5,887,610 A | | 3/1999 | Verbockhaven | |
| 6,582,516 B1 | * | 6/2003 | Carlson | 118/303 |
| 7,255,680 B1 | | 8/2007 | Gharib | |
| 7,536,962 B2 | | 5/2009 | Eastin et al. | |
| 7,591,287 B2 | * | 9/2009 | Hirahara | 141/2 |
| 8,019,478 B2 | | 9/2011 | Whitehurst et al. | |
| 8,265,597 B2 | | 9/2012 | Smith et al. | |
| 8,306,721 B2 | | 11/2012 | Maruyama | |
| 8,404,117 B1 | | 3/2013 | Steinbrueck et al. | |
| 8,458,953 B2 | * | 6/2013 | Hunter et al. | 47/57.6 |
| 2003/0004676 A1 | * | 1/2003 | Johansson | 702/138 |
| 2006/0255060 A1 | * | 11/2006 | Miller | 222/63 |
| 2007/0225934 A1 | | 9/2007 | Moriya et al. | |

(Continued)

FOREIGN PATENT DOCUMENTS

JP 2010096539 4/2010

OTHER PUBLICATIONS

Bayer CropScience Catalog. 2012. Available on line at: http://www.bayercropscience.us/products/seed-treatment-equipment/Documents/SeedTreatmentMachinery2012_Catalog.pdf.

Primary Examiner — Ramesh Patel
(74) Attorney, Agent, or Firm — Hovey Williams LLP

(57) ABSTRACT

Integrated, stand-alone, multiple-purpose pump stands are provided for controlled pumping of different liquids from a stand-mounted tank to a downstream use location, e.g., a seed treating device. The pump stands are equipped with an operating assembly including a liquid tank, a powered pump, a liquid flow line equipped with a flow meter from the tank and pump to the use location, and a programmable digital control device. During operation, the control device serves to approach and maintain the flow rate from the pump stand at or about a desired setpoint flow rate.

12 Claims, 3 Drawing Sheets

(56) References Cited

U.S. PATENT DOCUMENTS

| | | |
|---|---|---|
| 2010/0316446 A1 | 12/2010 | Runyon |
| 2011/0061418 A1 | 3/2011 | Ishihara et al. |
| 2011/0144882 A1 | 6/2011 | Bidner et al. |
| 2011/0217474 A1 | 9/2011 | McGough |
| 2011/0232177 A1* | 9/2011 | Eastin et al. .................. 47/57.7 |
| 2012/0111412 A1* | 5/2012 | Satake ............................ 137/1 |
| 2012/0183675 A1* | 7/2012 | Reineccius et al. .............. 427/4 |
| 2012/0189762 A1 | 7/2012 | Reineccius et al. |
| 2012/0192542 A1 | 8/2012 | Chillar et al. |
| 2012/0221259 A1 | 8/2012 | Yokohata |
| 2012/0323378 A1* | 12/2012 | Dykstra et al. ................ 700/282 |
| 2013/0092243 A1* | 4/2013 | Mohammed et al. ............. 137/2 |

\* cited by examiner

METHOD OF CONTROLLING THE FLOW RATE OF THE LIQUID BY CONTROLLING OPERATION OF THE PUMP

CROSS-REFERENCE TO RELATED APPLICATION

This application is a continuation of application Ser. No. 13/803,576, filed Mar. 14, 2013, which is incorporated by reference herein in its entirety.

BACKGROUND OF THE INVENTION

1. Field of the Invention

The present invention is broadly concerned with improved, stand-alone pump stands for controlling the flow rate of a liquid from a liquid source. More particularly, the invention is concerned with such pump stands, and corresponding methods, wherein the flow rate of liquid is rapidly approached and maintained at or about a preselected setpoint flow rate.

2. Description of the Prior Art

In many agricultural applications, seeds are coated with various liquid chemicals prior to planting. Such liquids may include pesticides, growth stimulants, or plant nutrients, and these liquids have a variety of different physical characteristics such as viscosities and drying rates. Seed treaters have been developed for coating large volumes of seed on an industrial basis. Generally, such treaters include a seed inlet, a sprayer or other device for applying coating liquids to the surfaces of the seeds, and some sort of rotating drum or the like to assure uniform seed coating. As such, it is necessary to deliver the treating liquids to the application device at a uniform flow rate. That is to say, if the liquids are delivered at variable flow rates, then the seeds will be differentially coated, depending upon the instant at which the seeds were treated with the liquid.

There are two basic types of pumping systems for handling and pumping of seed treating liquids delivered to downstream seed treaters. Most often, these systems are mounted on a stand or other support structure separate from the seed treaters. These systems include mix tank(s), pump(s), tubing system(s), and various types of monitoring and control equipment.

The first type is a "manual" system that uses a controller of some type to drive the pump motor(s) based upon a proportional signal. For example, the pump motor(s) can be operated at 50% of the maximum speeds thereof. If the operator needs to adjust the liquid flow rate exiting the pump, the flow rate must be manually adjusted using the controller. In these types of systems, the flow rate is typically determined either by an in-line flow meter, or a "catch and time" technique wherein the volume of liquid delivered over a selected period of time is measured, and the flow rate is thus determined. Some of these manual systems also have the ability to read a signal from a downstream seed treater to either turn on the pump(s), or to terminate the operation thereof. However, none have the ability to automatically adjust liquid flow rate over time. Furthermore, these systems do not have any means of automatically reporting the volume of liquids pumped, so the operator must either use a flow meter totalizer or some sort of mass balancing to calculate the total chemical usage for a given time period.

The second type of system is an automated or automatic system, and is generally plug-connected to a PLC-based controller that performs all of the logical steps for pumping operations.

In these systems, an operator may set a desired flow rate, and the pump speed will automatically adjust to meet that desired flow rate, based upon information received by the PLC from a connected flow meter. This is generally done via a PI (proportion-integral) or PID (proportion-integral-derivative) software control loop. These systems also have automatic reporting capabilities that show total chemical usage.

In many instances, upgrades are available for the manual and automatic systems, which allow adjustment of the liquid flow rate during operation. These upgrades allow an operator to offset via a multiplier any consistent inaccuracies that the flow meter may display. Such inaccuracies occur quite often with the use of standard volumetric/electromagnetic flow meters normally employed. All of the known manual system upgrades provide only a display device, and do not provide any control function. Moreover, they have only one adjustable offset or multiplier per flow meter.

As such, there are presently no "stand-alone" liquid pump stands which allow the operator to choose a desired setpoint flow rate, with the on-board controllers serving to automatically maintain the set point flow rate via adjustment of pump speeds. Moreover, none of the known "automatic" pump stands makes use of multiple PI or PID control loops to accomplish fast pump speed changes and steady pump speed control. Additionally, all adjustable flow rate displays for "stand-alone" pump stands have only one available adjustment for each flow meter. This means that if an operator wishes to run a different liquid through the same flow meter, then the operator must recalibrate the display of the flow meter, without the capacity to retain previously used calibration settings.

SUMMARY OF THE INVENTION

The present invention overcomes the problems outlined above and provides a movable stand-alone pump stand, which can be used to good effect with seed treater(s) so as to properly coat agricultural seeds with specified and essentially identical amounts of liquid chemicals. The pump stands of the invention generally include a supporting frame assembly (preferably of generally L-shaped design), which supports a complete operating assembly. That is to say, the operating assembly includes a liquid chemical tank, a powered pump, a flow line coupled with the tank and pump for delivery of liquid from the tank to a downstream seed treater, a flow meter operably attached to the flow line to determine the flow rate of liquid through the flow line during operation, and a programmable digital device operably coupled with the pump and flow meter in order to deliver liquid from the flow line at or about a preselected setpoint flow rate. The modular, stand-alone design of the pump stands greatly facilitates seed coating operations, and allows an operator to easily control all steps associated with such coating practices.

The digital device controller can be used to control the various pump stand operations described previously. However, from an operational standpoint, the ability to quickly approach and maintain a setpoint flow rate of liquids is of prime importance. As used herein, "at or about a setpoint flow rate" refers to the ability of the pump stands of the invention to maintain a preselected setpoint flow rate over time, with a relatively small plus or minus variance from the exact set point flow rate, e.g., plus or minus about 1-10%. It will be appreciated that the "plus or minus" variance is largely determined by the program variables described herein.

Thus, the invention further includes a method for controlling the flow rate of a liquid from a liquid source, which is applicable to fluids in general, but which is especially designed for seed-coating operations. The method broadly comprises the steps of:

(a) establishing a desired setpoint flow rate for the liquid from the source;

(b) pumping the liquid from the source using a powered pump, and determining the flow rate of the pumped liquid from the pump;

(c) controlling the operation of the powered pump to pump the liquid at a flow rate at or about the setpoint flow rate, by periodically comparing the determined flow rate of the liquid from the source with the setpoint flow rate, and:

(i) if the difference between the determined flow rate and the setpoint flow rate is at or above a first predetermined magnitude, operating the pump so as to alter the operation of the pump at a relatively high aggressive first correction rate, so that the determined flow rate approaches the setpoint flow rate at the aggressive first correction rate;

(ii) if the difference between the determined flow rate and the setpoint flow rate is at or above a second predetermined magnitude but below the first predetermined magnitude, operating the pump so as to alter the operation of the pump at a relatively low moderate second correction rate lower than the first correction rate, so that the determined flow rate approaches the setpoint flow rate at the moderate second correction rate; and (iii) continuing the controlling steps (c)(i) and (c)(ii) throughout the flow of liquid from the liquid source.

In preferred forms, the method includes a further step if the difference between the determined flow rate and the setpoint flow rate is at or above a third predetermined magnitude but below the second predetermined magnitude, operating the pump so as to alter the operation of the pump at a relatively lower conservative third correction rate lower than the second correction rate, so that the determined flow rate approaches the setpoint flow rate at the conservative third correction rate.

As noted previously, these method steps are carried out using a programmable digital device. The digital device may be user-operated where an operator inputs the setpoint flow rate and mode of operation, or such information may be electronically communicated to the digital device. During operation, the flow meter may be calibrated to ensure that the determined flow rate reported by the meter is the actual flow rate of the liquid. Such calibration may be carried out by measuring the flow of liquid through the flow meter for a selected period of time to give an actual flow rate for the liquid, comparing the measured flow rate with the flow rate reported by the flow meter, determining a correction factor unique to the flow meter and liquid, and storing the correction factor in electronic memory. A useful feature of the present invention is that the pump stand is equipped with electronic memory so that a plurality of correction factors may be stored for a corresponding plurality of different liquids. Hence, once the flow meter is calibrated and stored for a particular liquid, that calibration information can be retrieved when the corresponding liquid is again used with the pump stand.

In order to rapidly approach and maintain the flow rate of liquid from the pump stand at or about the setpoint flow rate, the digital control device is preferably programmed to apply a feedback control loop according to a tiered control scheme in order to carry out the steps (c)(i) through (c)(iii) described above. To this end, a multi-tiered proportional-integral-derivative (PID) control loop, or a multi-tiered proportional-integral (PI) control loop, is employed carry out these steps.

DETAILED DESCRIPTION OF THE PREFERRED EMBODIMENT

Pump Stand

Figure 1:
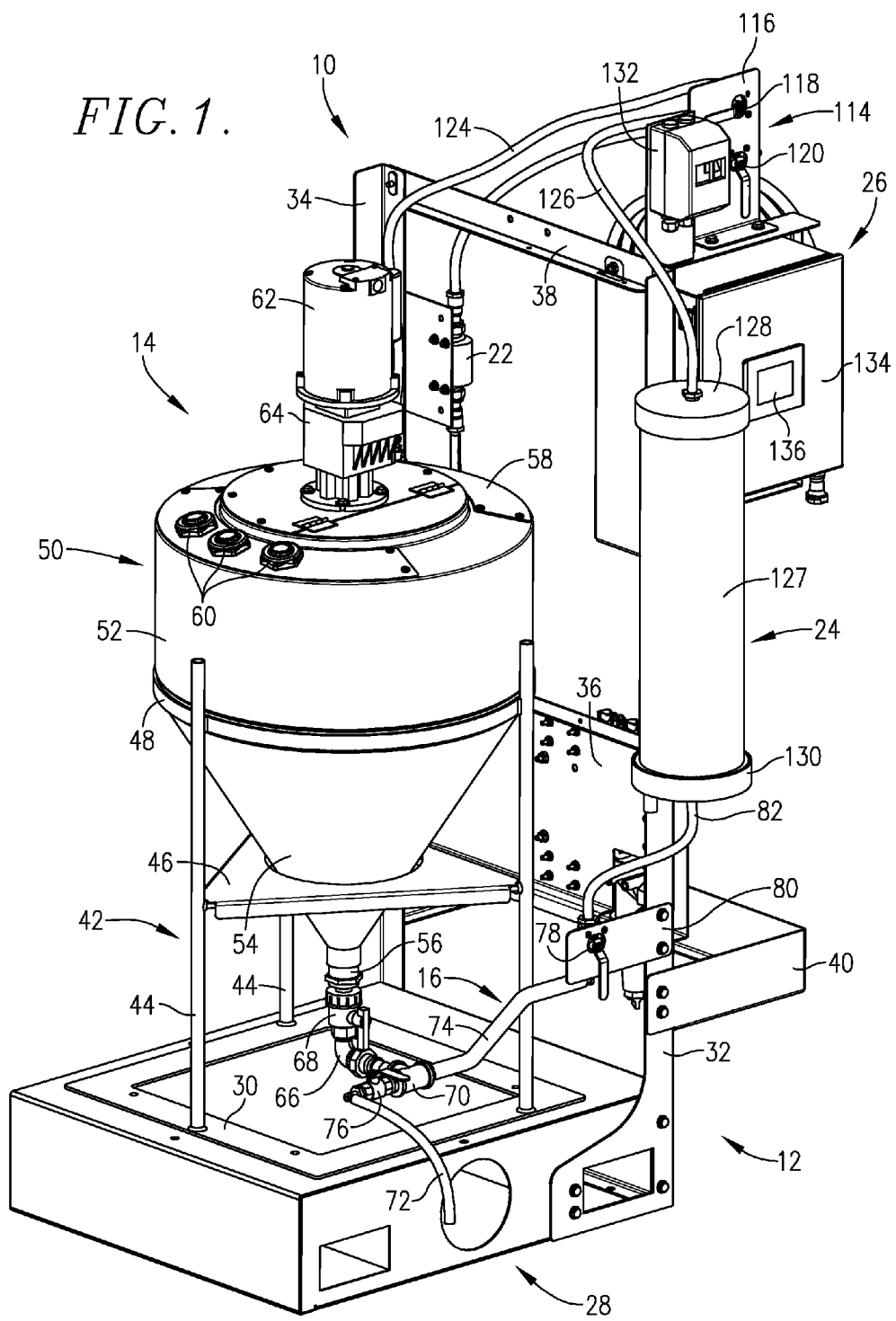
FIG. 1 is a front perspective view of a pump stand in accordance with the invention.
Figure 2:
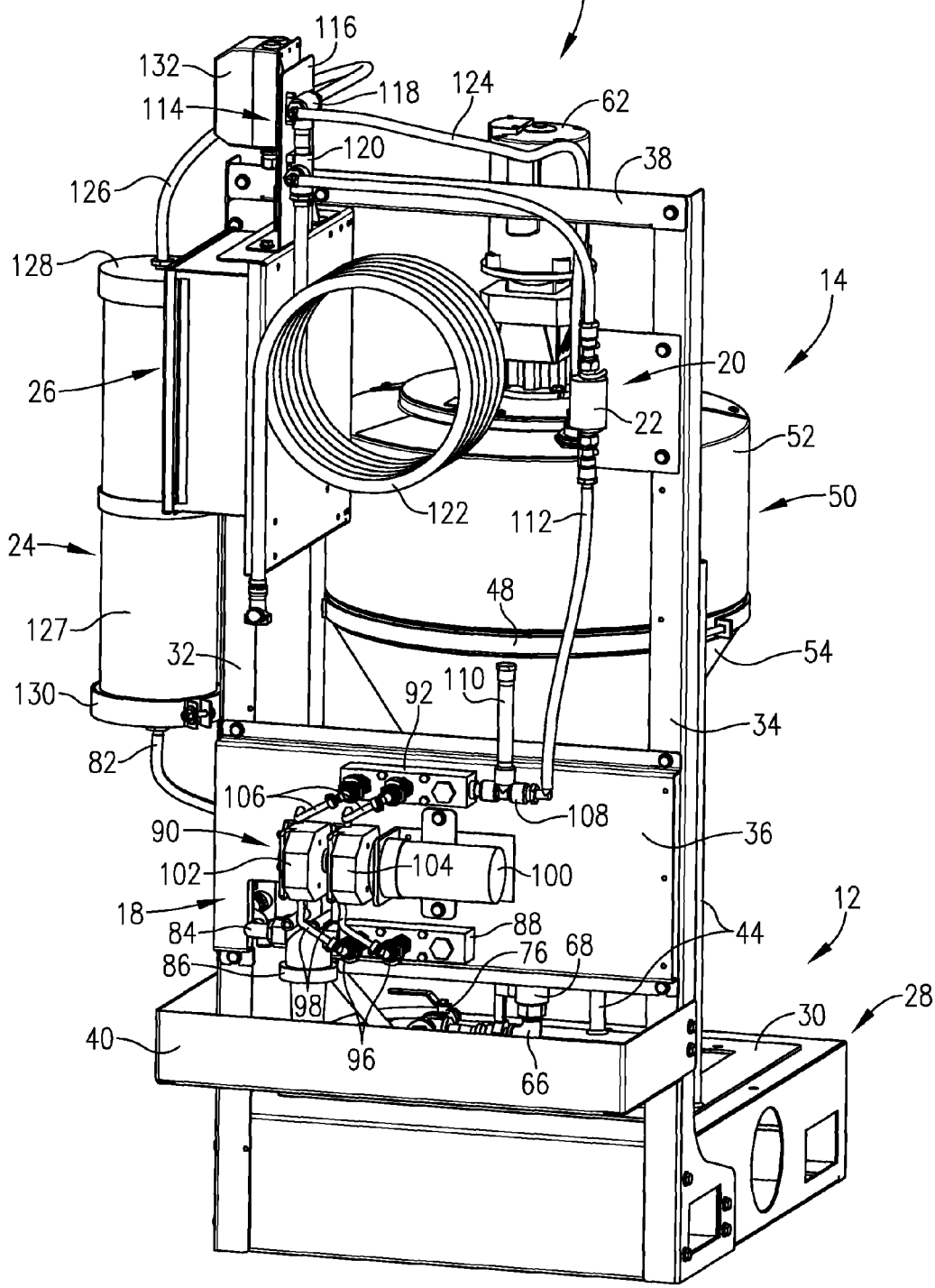
FIG. 2 is a rear perspective view of the pump stand depicted in FIG. 1.

Turning now to FIGS. 1-2, a pump stand 10 is illustrated. The stand 10 broadly includes a supporting frame assembly 12, a tank assembly 14, a first valve and conduit assembly 16, a pump and conduit assembly 18, a second valve and conduit assembly 20 with an in-line flow meter 22, a calibration tube 24, and control assembly 26. The pump stand 10 is designed to hold liquid chemical(s), typically used for seed coating, and to deliver calibrated amounts of the chemical(s) to a seed treater or the like. The pump stand 10 is completely self-contained, and has a number of features greatly facilitating accurate dispensing of chemical(s).

In more detail, the frame assembly 12 includes a box-like, quadrate base 28 presenting an uppermost mounting plate 30 and having a pair of upstanding, opposed frame arms 32 and 34 secured to the rear end of base 28. An equipment mount plate 36 extends between the arms 32, 34, and an uppermost rigidifying cross-brace 38 interconnects the arms 32, 34 at their uppermost ends. A generally U-shaped bumper 40 is secured to the arms 32, 34 and extends rearwardly therefrom.

The tank assembly 14 includes a triangular tank base 42 comprising three upstanding legs 44 secured to the mounting plate 30 with a generally triangular, intermediate apertured support plate 46 secured to the legs 44 above mounting plate 30. The upper end of the base 42 includes the generally circular hoop 48 likewise supported by the legs 44 adjacent the upper ends thereof. The base 42 is designed to support a conical-bottom liquid tank 50 including a generally circular upper wall 52 and a substantially frustoconical lower wall 54 having a lowermost liquid outlet 56. An upper tank cover 58 is positioned atop the circular wall 52 in order to close the tank 50 and to allow filling thereof through the ports 60. The cover 58 also supports an agitator drive motor 62 with an associated gear box 64. A central agitator shaft (not shown) is operably coupled with gear box 64 and extends into the confines of tank 50. The agitator shaft has conventional mixing elements so that the chemical(s) within tank 50 may be agitated to ensure proper mixing thereof.

The first valve and conduit assembly 16 includes a delivery pipe 66 operably coupled with tank outlet 56 and equipped with a diverter valve 68. The output end of pipe 66 is equipped with a tee 70. A drain conduit 72 is secured to one end of the tee 70, whereas a liquid delivery conduit 74 is secured to the opposite end of tee 70. The drain conduit 72 is also equipped with a two-way diverter valve 76. The assembly 16 also includes a two-way diverter valve 78 supported on a forwardly extending plate 80. The delivery conduit 74 is secured to the input of valve 78. A pair of output conduits 82 and 84 are also coupled with valve 78. Output conduit 82 extends to and is coupled with calibration tube 24, whereas output conduit 84 extends to and is connected with a liquid filter 86 secured to the rear face of mounting plate 36.

The pump and conduit assembly 18 includes a lower manifold block 88 secured to the rear face of equipment mounting plate 36, an intermediate pumping assembly 90, and an upper manifold block 92. The filter 86 is coupled to lower manifold block 88 for delivery of filtered chemicals to a pair of outputs 96, each equipped with a short conduit 98. The intermediate pumping assembly 90 includes an electrical drive motor 100 and a pair of pumping heads 102 and 104. The output of the head 104 is delivered through short conduits 106 to upper manifold block 92, which delivers the pumped liquid through output pipe 108 equipped with an upstanding turbulence-minimizing pipe 110.

The second valve and conduit assembly 20 includes a liquid conduit 112 coupled with the end of pipe 108 and equipped with the in-line flow meter 22, and a dual valve assembly 114 mounted on an upstanding plate 116 and having upper and lower valves 118 and 120. The upper end of conduit 112 is coupled with the lower valve 120, and the outputs thereof are respectively coupled with a coiled liquid delivery line 122, which is coupled to a downstream seed treater or other device, and to the input of upper valve 118. The outputs of valve 18 are respectively coupled with a recirculation conduit 124 leading to tank 50, and a calibration tube conduit 126.

The calibration tube is in the form of an elongated upright tube 127 equipped with upper and lower end caps 128 and 130, and a volumetric scale (not shown) imprinted on the body of the tube 127. As illustrated, the conduit 126 is secured to the upper end cap 128, whereas output conduit 82 is secured to lower end cap 130.

The control assembly 26 includes a conventional electrical junction box 132 and a controller 134 equipped with a touch pad output 136. The sequential operation of the pump stand 10 is governed and controlled by the controller 134, and this operation will be described in detail in connection with FIG. 3.

In alternative forms of the pump stand 10, a weigh scale (not shown) may be used in lieu of mounting plate 30 in order to provide continuous monitoring of the weight of chemical (s) within the tank.

Operation of the Pump Stand

There are four basic modes of operation for the pump stand 10, namely initial recirculation of liquid, pump calibration, normal calibrated delivery of liquids to the downstream seed treater or other device, and a reverse or flush operation.

The recirculation mode would typically be used during startup of the pump stand in order to ensure that the liquid chemicals within the tank 50 are uniformly mixed. In order to recirculate, the agitation drive motor is operated to mix the chemicals within tank 50. Also, the valve 68 is open to prevent delivery of liquid through outlet 56 and pipe 66, the valve 76 is closed, and the valve 78 is opened to deliver liquid through filter 86, lower manifold block 88, and pumping heads 102, 104. The lower valve 120 is set to deliver the pumped liquid to upper valve 188, which is set to deliver through recirculation conduit 124, back to tank 50. It will thus be seen that operation of the pump assembly 90 draws liquid front the tank 50 and ultimately recirculates this fluid back to the tank.

After adequate circulation is achieved, the stand 10 may be used if needed to calibrate the flow rate of the pumping assembly 90 in order to deliver consistent volumes of liquid per unit time through the delivery line 122. Specifically, in this mode of operation, the upper valve 118 is positioned so as to deliver liquid through the calibration tube conduit 126. This continues for a predetermined period of time (e.g., one minute), and the amount of liquid collected with calibration tube 24 is determined using the volumetric scale markings on tube 127. If the target output of the pumping assembly 90 is 50 ounces/minute, this can be determined using the collected amount of liquid. If the flow rate is either too high or too low relative to the desired output rate, the controller 134 can be operated to compensate for the difference. In this operation, the touch screen is tapped until a calibration screen appears, whereupon the underage or overage flow rate is adjusted to the target rate. The controller 134 thus provides a signal u(t) to the pumping assembly 90 to speed up or slow down, as the case may be, so as to deliver a consistent flow rate output to the downstream seed treater or the like. The controller 134 is also provided with continuous flow rate data owing to the presence of the in-line flow meter 22. Once calibration is achieved, the valve 78 is manipulated so that the pumping assembly 90 removes the liquid from the calibration tube 24, which is diverted through the pumping assembly 90, as described previously.

After optional calibration, the pump stand 10 is typically used in a normal delivery mode. This requires only that the valve 78 be manipulated after emptying of the calibration tube 24 so that the pumping assembly 90 draws liquid from the tank 50, and manipulation of lower valve 120 so that the pumped liquid is directed to the delivery line 122 for downstream use.

At the end of a given run, it may be necessary to change the liquid chemical(s) within tank 50 in order to deliver different chemical(s) for a subsequent run. In such a case, the valve 76 is opened to deliver liquid to the drain conduit 72, and the pump drive motor 100 is reversed. This serves to remove all liquids within the pump assembly and other conduits, while the material remaining in tank 50 is allowed to flow by gravitation through the conduit 72.

Before a fresh batch of liquid chemical(s) is delivered to tank 50, it may be desirable to flush the entire system. Water or other cleaning fluids are directed to tank 50, whereupon the pump stand 10 is operated in recirculation mode, as described above, followed by a second flush operation. The tank 50 can then be refilled with the necessary liquid chemical(s) for the subsequent run.

Automated Control of Pump Stand

As mentioned above, the controller 134 governs operation of the pump stand 10. The controller 134 is preferably a digital integrated circuit and may be a general use, commercial off-the-shelf computer processor, a programmable logic device configured for operation with the pump stand 10, or an application specific integrated circuit (ASIC) especially manufactured for use with the pump stand 10. The controller 134 may include two or more separate integrated circuits cooperating to control operation of the pump stand 10, and may include one or more analog elements operating in concert with or in addition to the digital circuit or circuits. The controller 134 may include or communicate with a memory element configured to store data, instructions, or both for use by the controller 134. The controller 134 is also referred to herein a programmable logic controller or PLC.

Figure 3:
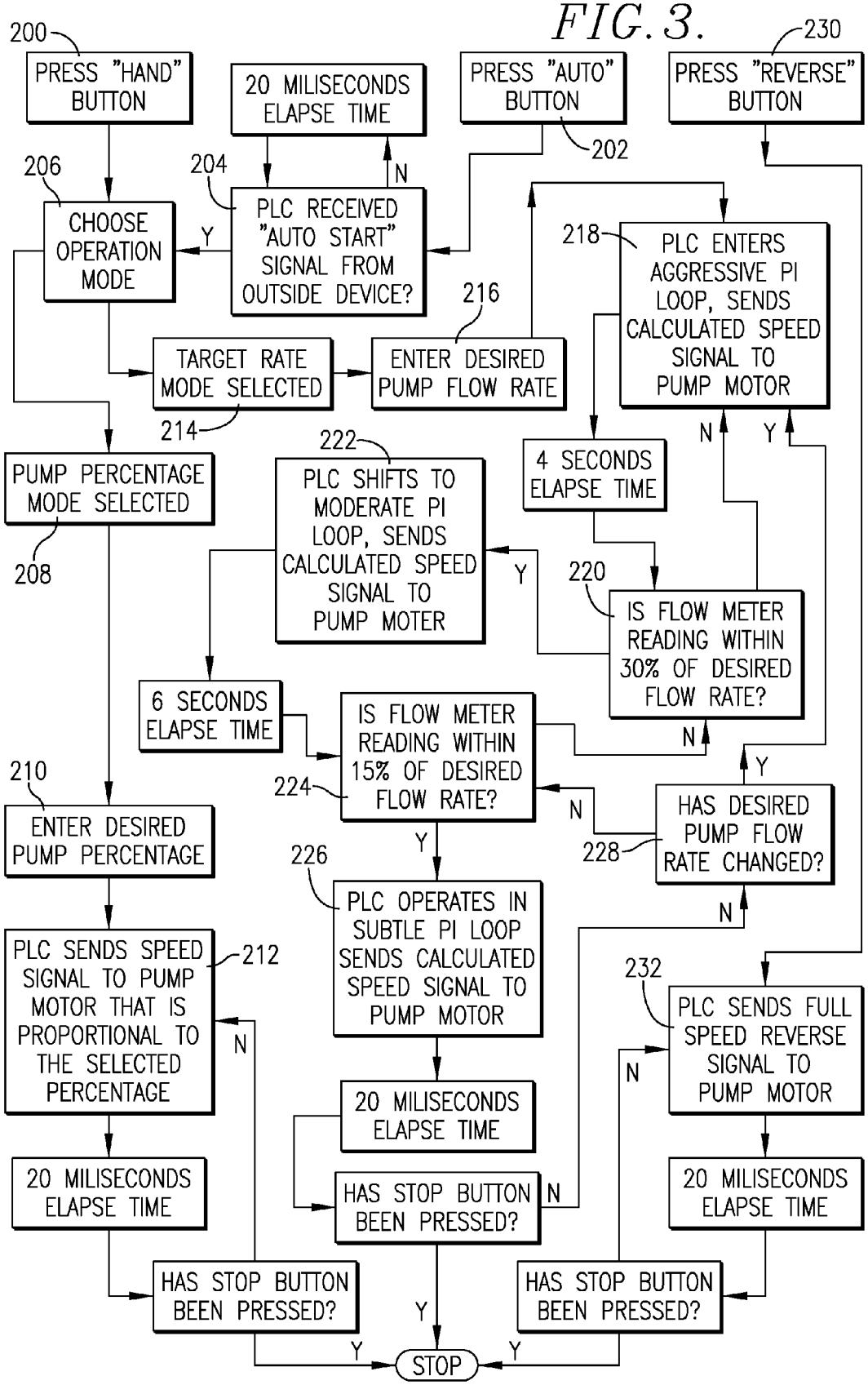
FIG. 3 is a schematic flow diagram illustrating the preferred digital processor control of the pump stand.

An exemplary sequence of control steps performed by the controller 134 is illustrated in the flow diagram of FIG. 3. Operation of the controller 134 may begin manually in response to a user input or automatically in response to a start signal received from an external device such as a seed treater. A user may manually launch a treatment application process by engaging a button or other user interface element designated for that purpose, as depicted in block 200, or may place the controller 134 in automatic start mode, as depicted in block 202. When the controller 134 is in the automatic start mode it automatically launches the process upon receiving the start signal, as indicated in block 204.

Whether the controller 134 begins the process in response to a manual input from a user or in response to a start signal, it first determines a mode of operation, as depicted in block 206. The controller 134 may determine the mode of operation by, for example, prompting the user to select the mode or by retrieving a previously-stored setting indicating the mode of operation. If a pump percentage mode is selected, as depicted in block 208, the controller 134 prompts the user to enter a desired percentage, as depicted in block 210, corresponding to a percentage of the maximum output or speed of the motor. The controller 134 then communicates the control signal u(t) to the pump motor to cause the pump motor to operate at the desired percentage, as depicted in block 212, until the user stops the motor. The pump percentage mode may be used, for example, during initial recirculation, while the target rate mode may be used during pump calibration and normal calibrated delivery.

If the controller 134 operates in the target rate mode 214 the controller 134 determines a flow rate setpoint, as depicted in block 216. The flow rate setpoint is the desired or target application flow rate. The controller 134 may prompt the user to submit the setpoint, for example, or may retrieve it from memory or receive it from an external device. The flow rate setpoint may change during operation, as explained below.

When the controller 134 has determined the flow rate setpoint, it then controls the pump motor to apply treatment as closely as possible to the setpoint. More specifically, the controller 134 determines a flow rate error e(t) corresponding to a difference between the actual flow rate (as indicated by the in-line flow meter 22) and the setpoint and uses a feedback control loop function to modify the actual flow rate to minimize the error. The value of e(t) may be expressed in various ways, including as a raw difference or as a percentage of the setpoint. The controller 134 applies a feedback control loop to control the pump motor according to a tiered control scheme wherein a more aggressive (faster) response is applied to greater values of e(t) and a more conservative (slower and more stable) response is applied to smaller values of e(t). More particularly, the controller 134 uses a multi-tiered proportional-integral-derivative ("PID") or proportional-integral ("PI") control loop to manipulate process control inputs (e.g., a motor control signal) to minimize e(t). In some embodiments, the controller 134 generates a pump motor control signal according to the following control equation:

$$u(t) = K_p \left[ e(t) + \frac{1}{T_n} \int_0^t e(\tau) d(\tau) + T_v \frac{d}{dt} e(t) \right] + U_{Offset}$$

wherein—
u(t) is the pump motor control signal;
e(t) is the error function defined above;
$K_p$ is a proportional coefficient;
$T_n$ is an integral coefficient;
$T_v$ is a derivative coefficient; and
$U_{Offset}$ is an offset variable for the motor control signal.

The controller 134 is configured to manipulate the values of $K_p$, $T_n$ and $T_v$ to shift the PID control function between a more aggressive response and a more conservative response. Generally, increasing the value of $K_p$ increases the aggressiveness of the control loop while increasing the value of $T_n$ decreases the aggressiveness of the control loop. The values of $K_p$ and $T_n$ will depend on other, implementation-specific variables such as the number of pump heads associated with the pump motor. The value of $U_{Offset}$ may be specific to particular application chemicals and/or particular application processes.

In one preferred embodiment, the variable $T_v$ is set to zero to entirely eliminate the derivative term from the equation such that the controller 134 implements a PI control function. Alternatively, the value of $T_v$ may be set to a very low number to minimize the influence of the derivative term on the output. By way of example, for aggressive operation, the value of $K_p$ may be within the range of from about 0.8 to about 0.5, for moderate operation may be within the range of from about 0.05 to about 0.2, and for conservative operation may be within the range of from about 0.02 to about 0.5. For aggressive operation, the value of $T_n$ may be within the range of from about 1.0 to about 4.0, for moderate operation may be within the range of from about 2.0 to about 5.0, and for conservative operation may be within the range of from about 4.0 to about 6.0. Table 1 illustrates exemplary values of $K_p$ and $T_n$ for aggressive, moderate and conservative loops when the pump motor is driving one pump head, two pump heads and three pump heads.

TABLE 1

|  | 1 Pump Head | 2 Pump Heads | 3 Pump Heads |
| --- | --- | --- | --- |
| Aggressive Loop | $K_p$ = 0.2<br>$T_n$ = 2.0 | $K_p$ = 0.15<br>$T_n$ = 2.5 | $K_p$ = 0.1<br>$T_n$ = 3.0 |
| Moderate Loop | $K_p$ = 0.1<br>$T_n$ = 3.0 | $K_p$ = 0.085<br>$T_n$ = 3.5 | $K_p$ = 0.075<br>$T_n$ = 4.0 |
| Conservative Loop | $K_p$ = 0.01<br>$T_n$ = 5.0 | $K_p$ = 0.01<br>$T_n$ = 5.0 | $K_p$ = 0.01<br>$T_n$ = 5.0 |

Returning again to FIG. 3, the controller 134 begins operation by entering the aggressive control loop and communicating the control signal u(t) to the pump motor, as depicted in block 218. The controller 134 periodically compares the actual flow rate with the setpoint to determine if e(t) has fallen below an aggressive threshold, as depicted in block 220. The aggressive threshold may be, for example, between about 20% and about 40%, and may particularly be about 25%, about 30% or about 35%. If the actual flow rate has fallen below the aggressive threshold, the controller 134 shifts to the moderate control loop and continues communicating the control signal u(t) to the pump motor, as depicted in block 222. The controller 134 periodically compares the actual flow rate with the setpoint to determine if e(t) has fallen below a moderate threshold, as depicted in block 224. The moderate threshold may be, for example, between about 10% and about 20%, and may particularly be about 12%, about 15% or about 18%. If e(t) has fallen below the moderate threshold, the controller 134 shifts to the conservative control loop and continues communicating the control signal u(t) to the pump motor, as depicted in block 226. If e(t) has not fallen below the moderate threshold, the controller 134 returns to block 220 to determine if e(t) is below the aggressive threshold.

When the controller 134 is operating in the conservative control loop, it remains in the conservative control loop until the user presses a stop button, until the setpoint changes as depicted in block 228, or until e(t) exceeds the moderate threshold. If the setpoint changes the controller 134 shifts back into the aggressive control loop to bring the actual flow rate near the setpoint as quickly as possible, then shifts back into the moderate and conservative control loops as e(t) decreases, as explained above.

The user may initiate the reverse or flush operation set forth above by engaging a button or other user interface element designated for that purpose, as depicted in block 230, wherein the controller 134 drives the pump motor in reverse, as depicted in block 232. The controller 134 continues driving the pump motor in reverse until the user presses a stop button.

The controller 134 may store operational parameters associated with particular chemical mixtures and/or particular processes so that when a user reinitiates a process that was previously run the controller 134 recalls the parameters associated with that process, thus relieving the user of the burden of recalibrating the pump stand 10 each time a process is run. Using the touch pad 136, for example, the user may calibrate the pump stand 10 for use with a first chemical mixture. First calibration information specific to the first chemical mixture is created and used, for example, to adjust the output of the flow meter 22. The controller 134 stores the first calibration information in the memory. When the pump stand 10 is subsequently used with a different process that involves a second chemical mixture the user calibrates the pump stand 10 for the second mixture. The controller 134 associates second calibration information with the second mixture and stores the second calibration information in memory. This process may be repeated for multiple chemical mixtures, wherein the controller 134 stores separate calibration information for each of the chemical mixtures.

Thereafter, each time the user desires to use the first chemical mixture he or she simply selects the first mixture via the touch pad 136 wherein the controller 134 retrieves the first calibration information from memory. In this manner, the controller 134 may retrieve and use operational parameters associated with any of the previously used chemical mixtures. While the discussion above has focused on the use of calibration information used to adjust the output of the flow meter 22, the operational parameters stored in memory and retrieved by the controller 134 may also be associated with any of the variables $K_p$, $T_n$, $T_v$, $U_{Offset}$.

We claim:

1. A method of controlling the flow rate of a liquid from a liquid source to a use location where the liquid is expended, comprising the steps of:
    (a) establishing a desired set point flow rate for the liquid from the source;
    (b) pumping said liquid from said source towards said use location using a powered pump, and determining the flow rate of the pumped liquid from said pump;
    (c) controlling the operation of said powered pump using a controller device to pump the liquid at a flow rate at or about said set point flow rate, by periodically comparing said determined flow rate of the liquid from said source with said set point flow rate, and:
        (i) if the difference between said determined flow rate and the set point flow rate is at or above a first predetermined magnitude, operating said pump so as to alter the operation of the pump at a relatively high aggressive first correction rate, so that said determined flow rate approaches said set point flow rate at the aggressive first correction rate;
        (ii) if the difference between said determined flow rate and the set point flow rate is at or above a second predetermined magnitude but below said first predetermined magnitude, operating said pump so as to alter the operation of the pump at a relatively low moderate second correction rate lower than said first correction rate, so that the determined flow rate approaches said set point flow rate at the moderate second correction rate; and
        (iii) continuing said controlling steps (c)(i) and (c)(ii) throughout the flow of liquid from said liquid source.

2. The method of claim 1, including the step of controlling the operation of said powered pump such that if the difference between said determined flow rate and the set point flow rate is at or above a third predetermined magnitude but below said second predetermined magnitude, operating said pump so as to alter the operation of the pump at a relatively lower conservative third correction rate lower than said second correction rate, so that said determined flow rate approaches said set point flow rate at the conservative third correction rate.

3. The method of claim 1, including the step of carrying out step (c) using a programmable digital device.

4. The method of claim 3, including the step of entering said set point flow rate using a human operator interface operably coupled with said digital device.

5. The method of claim 1, including the step of calibrating said flow meter so that said determined flow rate is the actual flow rate of said liquid.

6. The method of claim 5, including the step of calibrating said flow meter for the liquid being pumped prior to said controlling step (c), by measuring the flow of liquid through the flow meter for a selected period of time to give an actual flow rate for the liquid, comparing said measured flow rate with the flow rate reported by the flow meter, determining a correction factor unique to the flow meter and liquid, and storing said correction factor in electronic memory.

7. The method of claim 6, including the step of calibrating a plurality of correction factors for a corresponding plurality of different liquids, and storing said plurality of correction factors in said electronic memory.

8. The method of claim 3, said digital control device programmed to apply a feedback control loop according to a tiered control scheme in order to carry out steps (c)(i) through (c)(iii).

9. The method of claim 8, including the step of using a multi-tiered proportional-integral-derivative (PID) control loop in order to carry out steps (c)(i) through (c)(iii).

10. The method of claim 8, including the step of using a multi-tiered proportional-integral (PI) control loop in order to carry out steps (c)(i) through (c)(iii).

11. The method of claim 1, said liquid being a seed coating liquid.

12. The method of claim 11, said seed coating liquid being applied to seed at said use location.

* * * * *